US012518909B2

(12) United States Patent
Kunimori et al.

(10) Patent No.: US 12,518,909 B2
(45) Date of Patent: Jan. 6, 2026

(54) COIL COMPONENT AND METHOD OF MANUFACTURING COIL COMPONENT

(71) Applicant: Murata Manufacturing Co., Ltd., Kyoto-fu (JP)

(72) Inventors: Keisuke Kunimori, Nagaokakyo (JP); Yuuki Kawakami, Nagaokakyo (JP); Ryuichiro Tominaga, Nagaokakyo (JP); Yoshimasa Yoshioka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 968 days.

(21) Appl. No.: 17/654,994

(22) Filed: Mar. 15, 2022

(65) Prior Publication Data

US 2022/0319764 A1 Oct. 6, 2022

(30) Foreign Application Priority Data

Mar. 30, 2021 (JP) ................................ 2021-056334

(51) Int. Cl.

| | |
|---|---|
| ***H01F 27/28*** | (2006.01) |
| ***H01F 27/32*** | (2006.01) |
| ***H01F 41/12*** | (2006.01) |

(52) U.S. Cl.

CPC ....... *H01F 27/2828* (2013.01); *H01F 27/327* (2013.01); *H01F 41/127* (2013.01)

(58) Field of Classification Search

CPC ... H01F 27/2828; H01F 27/327; H01F 41/127

See application file for complete search history.

(56) References Cited

U.S. PATENT DOCUMENTS

| | | | | |
|---|---|---|---|---|
| 2003/0234437 A1* | 12/2003 | Yamamoto | ............. | H10D 84/00 257/E21.582 |
| 2014/0266547 A1* | 9/2014 | Watanabe | ............. | H01F 41/042 336/200 |
| 2014/0306792 A1* | 10/2014 | Yoneda | ............... | H01F 17/0013 336/200 |
| 2018/0096789 A1* | 4/2018 | Oshima | ................. | H01F 41/046 |
| 2019/0115150 A1* | 4/2019 | Yoshioka | .............. | H01F 41/046 |
| 2020/0027645 A1* | 1/2020 | Yoshioka | .............. | H01F 27/323 |
| 2021/0249171 A1* | 8/2021 | Okumura | .............. | H01F 27/366 |

FOREIGN PATENT DOCUMENTS

| | | | | |
|---|---|---|---|---|
| CN | 109671551 A | 4/2019 | | |
| JP | 2006324566 A | * 11/2006 | | |
| JP | 2014-103815 A | 6/2014 | | |
| JP | 2016225464 A | * 12/2016 | ......... | H01F 17/0006 |
| JP | 2019-075478 A | 5/2019 | | |

* cited by examiner

*Primary Examiner* — Malcolm Barnes

(74) *Attorney, Agent, or Firm* — Studebaker Brackett PLLC

(57) ABSTRACT

An inductor conductor is configured such that, with respect to a height-wise dimension of the inductor conductor between the top surface and the bottom surface thereof, the height-wise dimension of a central portion of the top surface is smaller than the height-wise dimension of an edge portion of the top surface at a cross section of the inductor conductor taken in a direction orthogonal to an extending direction of the inductor conductor.

17 Claims, 8 Drawing Sheets

COIL COMPONENT AND METHOD OF MANUFACTURING COIL COMPONENT

CROSS-REFERENCE TO RELATED APPLICATION

This application claims benefit of priority to Japanese Patent Application No. 2021-056334 filed Mar. 30, 2021, the entire content of which is incorporated herein by reference.

BACKGROUND

Technical Field

The present disclosure relates to a coil component in which a wire-like inductor conductor is embedded in the main body and also to a method of manufacturing the coil component, and in particular, relates to a coil component having a structure in which the inductor conductor is covered with a resin-containing layer and also to a method of manufacturing the coil component.

Background Art

Japanese Unexamined Patent Application Publication No. 2014-13815 describes that an inductor conductor that extends spirally is covered with an insulating resin layer. In Japanese Unexamined Patent Application Publication No. 2014-13815, the insulating resin layer having a flat outer surface is illustrated.

SUMMARY

In reality, however, as illustrated by way of example in FIG. 27, a convex surface 3 is formed partially on the outer surface of an insulating resin layer 2 that covers an inductor conductor 1. The convex surface 3 is formed so as to follow the outer shape of the inductor conductor 1.

Referring to FIG. 27, the inductor conductor 1 is formed on a substrate 4 that is made of an electrically insulating material. For example, the inductor conductor 1 is formed by electrolytic plating. A conductive seed layer (not illustrated) is formed first on the substrate 4 to supply an electric charge for the electrolytic plating, and the inductor conductor 1 is subsequently grown on the seed layer by electrolytic plating. Accordingly, the inductor conductor 1 protrudes from the surface of the substrate 4.

As a result, when the insulating resin layer 2 is formed so as to cover the inductor conductor 1, the convex surface 3 is also formed on the outer surface of the insulating resin layer 2 so as to follow the shape of the inductor conductor 1. More specifically, the peak of the convex surface 3 is positioned above the width-wise center of the inductor conductor 1. The height H1 of the inductor conductor 1 is, for example, 50 to 100 μm. It is known from the study of the present inventors that the height H2 of the peak of the convex surface 3 from the bottom of an adjacent concave surface is more or less 20% of the height H1 of the inductor conductor 1. Note that the height H2 of the peak of the convex surface 3 illustrated in FIG. 27 is somewhat exaggerated.

The height H2 of the peak of the convex surface 3 described above is desirably as small as possible on the insulating resin layer 2. The convex surface 3 not only deteriorates the product appearance but also leads to unstable installation of the product. An additional work such as grinding is sometimes performed to flatten and eliminate the convex surface 3. In this case, as the height H2 of the peak of the convex surface 3 is smaller, the additional work becomes easier, leading to cost reduction.

Accordingly, the present disclosure provides a structure of a coil component that can improve the surface flatness of the resin-containing layer, such as the insulating resin layer, that covers the inductor conductor and also to provide a method of manufacturing the coil component.

According to an aspect of the present disclosure, a coil component includes a wire-like inductor conductor having a top surface and a bottom surface that are positioned opposite to each other and also having a first side surface and a second side surface that are positioned opposite to each other and connect the top surface and the bottom surface. The coil component also includes a resin-containing layer that at least covers the top surface, the first side surface, and the second side surface of the inductor conductor.

In the above coil component, with respect to a height-wise dimension of the inductor conductor between the top surface and the bottom surface, the height-wise dimension of a central portion of the top surface is smaller than the height-wise dimension of an edge portion of the top surface at a cross section of the inductor conductor taken in a direction orthogonal to an extending direction of the inductor conductor.

According to another aspect of the present disclosure, a method of manufacturing a coil component includes i) a step of preparing a support substrate, ii) a step of forming a wire-like inductor conductor when supported by the support substrate, the inductor conductor having a top surface and a bottom surface that are positioned opposite to each other and also having a first side surface and a second side surface that are positioned opposite to each other and connect the top surface and the bottom surface, iii) a step of forming a resin-containing layer that at least covers the top surface, the first side surface, and the second side surface of the inductor conductor, and iv) a step of removing the support substrate.

In the above method of manufacturing a coil component, the step of forming the inductor conductor includes a step in which, with respect to a height-wise dimension of the inductor conductor between the top surface and the bottom surface, the height-wise dimension of a central portion of the top surface is made smaller than the height-wise dimension of an edge portion of the top surface at a cross section of the inductor conductor taken in a direction orthogonal to an extending direction of the inductor conductor.

With the coil component according to the present disclosure, the resin-containing layer formed so as to cover the inductor conductor tends to subside at a position above the width-wise center of the inductor conductor. As a result, the subsidence of the resin-containing layer offsets the height of a convex portion that would be otherwise generated on the surface of the resin-containing layer if the resin-containing layer simply covered the inductor conductor.

This can reduce a height difference between the convex portion and the concave portion on the surface of the resin-containing layer, which can improve the surface flatness. This improves the product appearance and also leads to stable installation of the coil component. In addition, this can reduce or eliminate an additional work to smooth out the convex portions, thereby reducing the cost of the additional work.

DETAILED DESCRIPTION

First Embodiment

Figure 1:
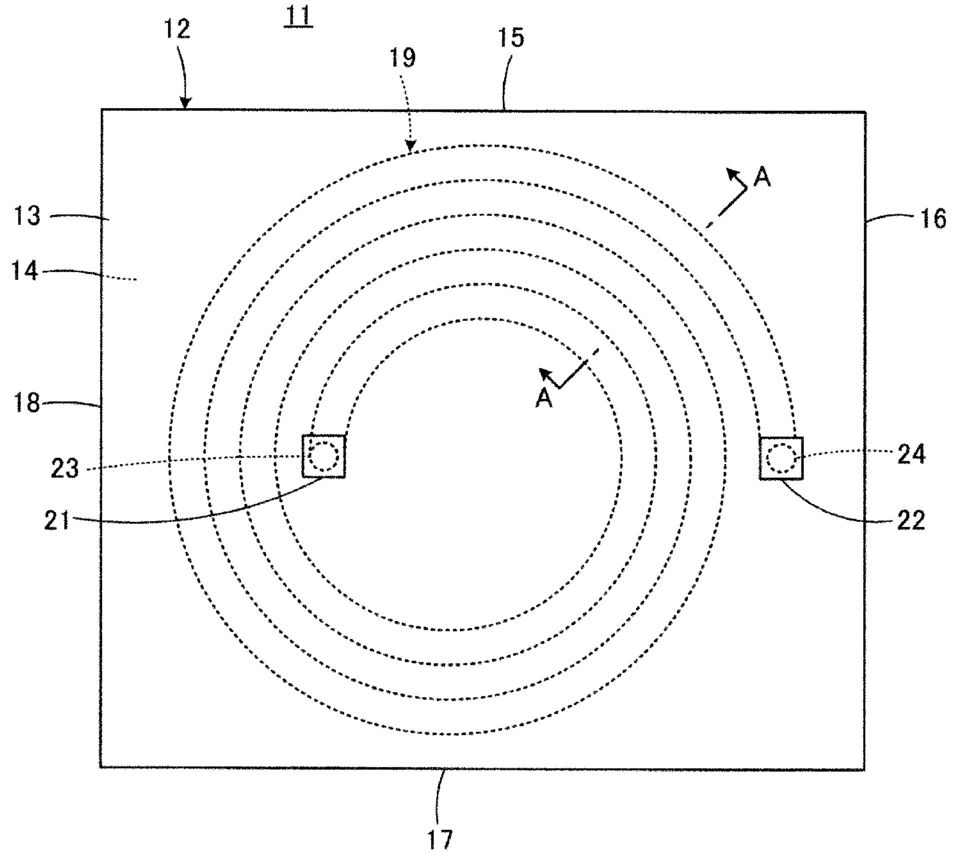
FIG. 1 is a plan view illustrating an external appearance of a magnetic resin layer of a coil component.

A structure of a coil component 11 according to a first embodiment of the present disclosure will be described with reference to FIGS. 1 and 2.

The coil component 11 includes a main body 12. The main body 12 is shaped like a plate or a cuboid and has a first principal surface 13 and a second principal surface 14 that are positioned opposite to each other. The main body 12 also has four end surfaces 15, 16, 17, and 18 that connect the first principal surface 13 and the second principal surface 14. The terms “principal surface” and “end surface” are so named for convenience’ sake. These terms, however, are used in a relative manner. Accordingly, the “principal surface”, for example, does not necessarily refer to the broadest surface in a cuboid.

A wire-like inductor conductor 19 that extends, for example, spirally is disposed inside the main body 12. The inductor conductor 19 is disposed so as to extend spirally on a plane parallel to the principal surfaces 13 and 14. External terminal electrodes 21 and 22 are formed on the first principal surface 13 of the main body 12. One end and the other end of the inductor conductor 19 are electrically connected to respective external terminal electrodes 21 and 22 via lead-out conductors 23 and 24.

The inductor conductor 19 and the lead-out conductors 23 and 24 may be made, for example, of Au, Pt, Pd, Ag, Cu, Al, Co, Cr, Zn, Ni, Ti, W, Fe, Sn, or In, or a compound thereof. The inductor conductor 19 is preferably made of Cu or a Cu alloy from the viewpoint of better conductivity and cost efficiency.

For example, the external terminal electrodes 21 and 22 have respective foundation layers being in contact with the lead-out conductors 23 and 24. Each foundation layer includes a non-electrolytic plating layer of Cu, an electrolytic plating layer of Ni formed thereon, and an electrolytic plating layer of Au formed further thereon.

Figure 2:
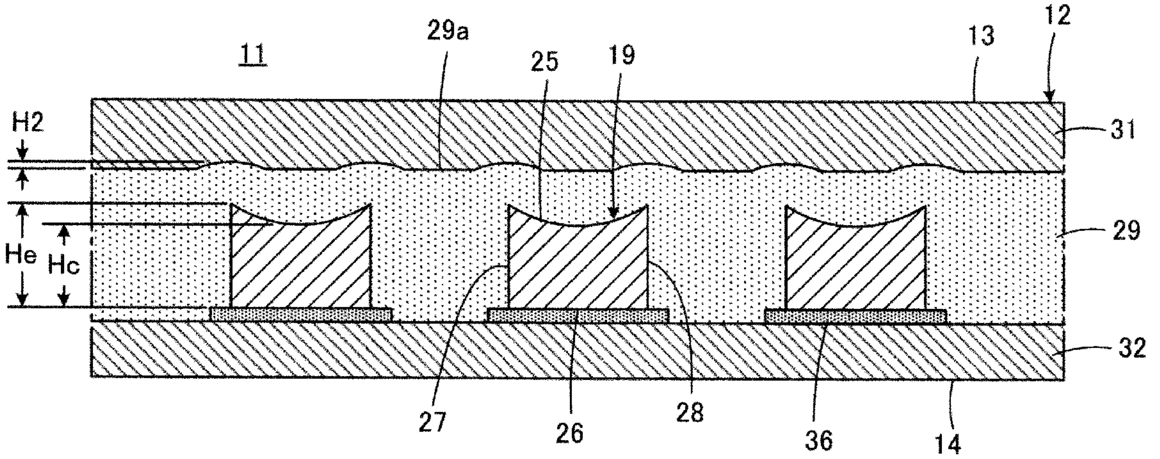
FIG. 2 is an enlarged cross section of part of the coil component of FIG. 1 taken along line A-A in FIG. 1.

FIG. 2 is a cross section of the inductor conductor 19 that is taken in a direction orthogonal to the extending direction of the inductor conductor 19. Referring to FIG. 2, the inductor conductor 19 has a top surface 25 and a bottom surface 26 that are positioned opposite to each other and also has a first side surface 27 and a second side surface 28 that are positioned opposite to each other and connect the top surface 25 and the bottom surface 26. Note that the first side surface 27 and the second side surface 28 may be collectively referred to as “side surfaces 27 and 28”. In FIG. 2, the top surface 25 is curved concavely. When a height direction extends between the top surface 25 and the bottom surface 26, the height-wise dimension Hc of a central portion of the top surface 25 is smaller than height-wise dimensions He of both edge portions of the top surface 25. In other words, with respect to the height-wise dimension, the dimension of the central portion of the top surface 25 is smaller than the dimension of the edge portion of the top surface 25.

The main body 12 also includes an insulating resin layer 29 that covers at least the top surface 25 and the side surfaces 27 and 28 of the inductor conductor 19. The insulating resin layer 29 are made, for example, of epoxy resin, acrylic resin, phenolic resin, or polyimide resin, or a mixture thereof. The insulating resin layer 29 is an electrical insulator and a non-magnetic body.

The main body 12 further includes a first magnetic resin layer 31 and a second magnetic resin layer 32 that cover the insulating resin layer 29. The magnetic resin layers 31 and 32 are made of an organic material containing a metal-based magnetic powder. For example, the metal-based magnetic powder is made of an alloy containing Fe, such as an Fe—Si based alloy, of which an average grain size is 5 μm or less. The metal-based magnetic powder may be made of a crystalline or an amorphous material. An oxide-based magnetic powder, such as ferrite, may be used for the metal-based magnetic powder. The organic material, for example, may be epoxy resin, a mixture of the epoxy resin and acrylic resin, or a mixture of the epoxy resin, the acrylic resin, and another resin.

As described above, the top surface 25 of the inductor conductor 19 is curved concavely, and the height-wise dimension Hc of the central portion of the top surface 25 is smaller than the height-wise dimensions He of both edge portions of the top surface 25. Accordingly, the resin of the insulating resin layer 29 that is placed so as to cover the inductor conductor 19 behaves such that a portion of the resin over the width-wise center of the inductor conductor 19 tends to sink. As a result, even if convex portions are formed on a surface 29*a* of the insulating resin layer 29 as illustrated in FIG. 2, the height H2 of the peak of each convex portion from the bottom of an adjacent concave portion on the surface 29*a* can be made small.

The magnetic resin layers 31 and 32 cover the insulating resin layer 29 so as to follow the shape of the surface 29*a* of the insulating resin layer 29, which can almost eliminate the undulations of the surfaces of the magnetic resin layers 31 and 32. This improves the product appearance of the coil component 11 and increases the stability of the coil component 11 when it is mounted. In addition, this can reduce or eliminate an additional work to smooth out the convex portions, thereby reducing the cost of the additional work.

With respect to the height-wise dimension of the inductor conductor 19 between the top surface 25 and the bottom surface 26, the difference between the maximum dimension and the minimum dimension is preferably 20% or less of the maximum dimension at a cross section taken in a direction orthogonal to the extending direction of the inductor conductor 19. In the present embodiment, the maximum dimension is the height-wise dimension He of the edge portion, and the minimum dimension is the height-wise dimension Hc of the central portion. Accordingly, the difference between the maximum dimension and the minimum dimension is expressed in the formula: $(He-Hc)/He \leq 0.2$. A reduction in the height-wise dimension Hc of the central portion of the top surface 25 at the width-wise center decreases the cross-sectional area of the inductor conductor 19 and thereby increases the electric resistance of the inductor conductor 19. When the inductor conductor 19 satisfies the above condition, however, the increase of the electric resistance of the inductor conductor 19 can stay within acceptable limits.

It should be understood that the difference between the maximum and the minimum of the height-wise dimension of the inductor conductor 19 can be obtained by measuring the height-wise dimension at one cross section of the inductor conductor 19 taken in a direction orthogonal to the extending direction of the inductor conductor 19 and not by measuring all the height-wise dimensions of the inductor conductor 19 at cross sections along the entire length of the inductor conductor 19. This is because when the inductor conductor 19 is formed so as to keep the above difference at or below the 20% level at least at one cross section, the increase of the electric resistance of the inductor conductor 19 is known to stay within acceptable limits. In actual measurement, it is desirable, for example, to use a cross section taken so as to include the center of the first principal surface 13 of the main body 12.

In order to better obtain the above-described advantageous effects, with respect to the height-wise dimension of the inductor conductor 19 between the top surface 25 and the bottom surface 26, the difference between the maximum dimension and the minimum dimension is preferably 5% or more of the maximum dimension.

FIG. 2 illustrates a member that is disposed so as to be in contact with the bottom surface 26 of the inductor conductor 19. The member is part of a base layer 36 that has retained a seed layer to be integrated into the inductor conductor 19, which will be clarified in the later description of the manufacturing method.

The above-described insulating resin layer 29 and magnetic resin layers 31 and 32, all of which contain resin, are generally referred to as a “resin-containing layer”. In the present embodiment, the resin-containing layer includes the insulating resin layer 29 that is in contact with the inductor conductor 19 and serves as a foundation and also includes the magnetic resin layers 31 and 32 that cover the insulating resin layer 29. In some embodiments of the present disclosure, the resin-containing layer may include only the insulating resin layer and include no magnetic resin layer, or the resin-containing layer may include only the magnetic resin layer and include no insulating resin layer.

The insulating resin layer 29 is a non-magnetic body that does not contain a magnetic substance. The insulating resin layer 29 improves electrical insulation between the inductor conductor 19 and a component outside the coil component 11, insulation between adjacent turns of the inductor conductor 19, and insulation between the inductor conductor 19 and the metal-based magnetic powder contained in the magnetic resin layers 31 and 32. The magnetic resin layers 31 and 32 serve to form magnetic circuits.

In the present embodiment, the insulating resin layer 29 integrally forms a portion that covers the top surface 25 and portions that cover the side surfaces 27 and 28 around the inductor conductor 19. In other words, in the resin-containing layer, the portion to cover the top surface 25 and the portions to cover the side surfaces 27 and 28 are integrally made of the same material. With this configuration, the mechanical strength of the insulating resin layer 29 around the inductor conductor 19 can be improved against shearing stress, which can reduce the likelihood of the insulating resin layer 29 being peeled off and also can reduce the likelihood of a short circuit occurring between the inductor conductor 19 and the metal-based magnetic powder in the magnetic resin layers 31 and 32.

FIG. 2 illustrates the cross sections of the inductor conductor 19 taken along line A-A in FIG. 1, which are cross sections taken in a direction orthogonal to the extending direction of the inductor conductor 19. All of the cross sections of the inductor conductor 19 illustrated in FIG. 2 satisfy the condition that with respect to the height-wise dimension of the inductor conductor 19 between the top surface 25 and the bottom surface 26, the height-wise dimension of the central portion of the top surface 25 is smaller than the height-wise dimensions of both edge portions of the top surface 25. The inductor conductor, however, does not necessarily satisfy this condition over its entire length.

Next, a preferred method of manufacturing the coil component 11 will be described with reference to FIGS. 3 to 13. FIGS. 3 to 13 illustrate a manufacturing method related to a portion in which an inductor conductor 19 of FIG. 2 is formed.

Figure 3:
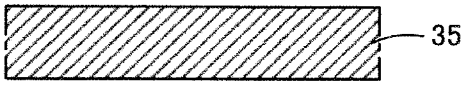
FIG. 3 is a cross-sectional view for explanation of a method of manufacturing the coil component of FIG. 1, illustrating part of a support substrate to be prepared.

As illustrated in FIG. 3, a support substrate 35 is prepared first. For example, the support substrate 35 is made of a material having a relatively high flexural strength, such as a ceramic material or a resin.

Figure 4:
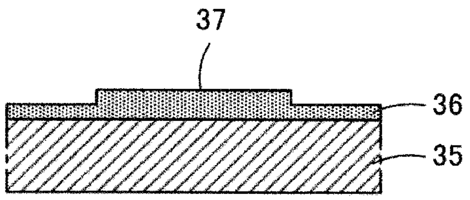
FIG. 4 is a cross-sectional view illustrating a state in which a base layer is formed on the support substrate in a step that follows the step of FIG. 3.

Next, as illustrated in FIG. 4, the base layer 36 is formed on the support substrate 35. The base layer 36 is provided to retain a seed layer 38 in a desired manner, which will be described later. For example, the base layer 36 is made of a resin. The base layer 36 has a projection 37.

Figure 5:
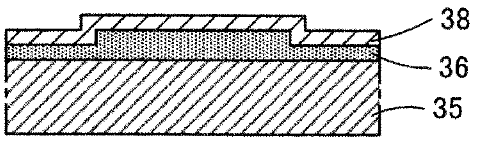
FIG. 5 is a cross-sectional view illustrating a state in which a seed layer is formed on the base layer in a step that follows the step of FIG. 4.

Next, as illustrated in FIG. 5, the electrically conductive seed layer 38 is formed on the support substrate 35. In the present embodiment, the seed layer 38 is formed on the support substrate 35 with the base layer 36 being interposed therebetween. The seed layer 38 may be formed directly on the support substrate 35 or may be formed on the above-described base layer 36 or may be formed on an insulating layer deposited on the support substrate 35. The seed layer 38 is provided to supply electric charge when the inductor conductor 19 is formed by electrolytic plating. For example, the seed layer 38 is preferably made of the same material as that of the inductor conductor 19, in other words, Au, Pt, Pd, Ag, Cu, Al, Co, Cr, Zn, Ni, Ti, W, Fe, Sn, or In, or a compound thereof.

The seed layer 38 is preferably made of the same material as that of the inductor conductor 19 from the viewpoint of forming the inductor conductor 19. It is preferable, however, that the seed layer 38 be made of a material, such as Ti, that has better properties of adhesion to resin in the case where the inductor conductor 19 is made of a material, such as Cu, that is adhered poorly to the resin-made base layer 36. Moreover, the seed layer 38 preferably has a multilayer structure in which a layer made of the same material as that of the inductor conductor 19 is laminated on a layer made of a material that can be better adhered to resin.

The seed layer 38 can be formed, for example, by non-electrolytic plating, sputtering, or a method of laminating a copper foil using a thin adhesive sheet. The thickness of the seed layer 38 is not specifically limited insofar as the seed layer 38 can supply electric charge and function appropriately in the electrolytic plating. It is desirable, however, that the thickness of the seed layer 38 be 2 μm or less.

Figure 6:
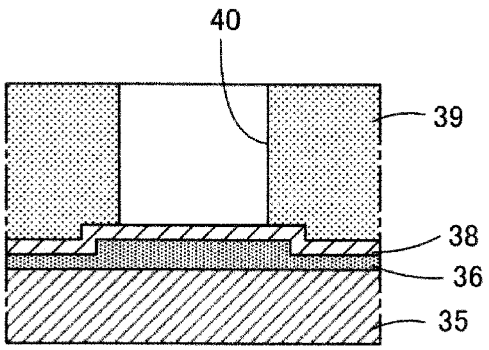
FIG. 6 is a cross-sectional view illustrating a state in which a resist is formed on the seed layer in a step that follows the step of FIG. 5.

Next, as illustrated in FIG. 6, a resist 39 is formed on the seed layer 38. The resist 39 has a cavity 40 that is patterned so as to correspond to the pattern of the inductor conductor 19. For example, the resist 39 is formed using a dry film resist. More specifically, the dry film resist is laminated on the seed layer 38 while the protection film is peeled off, and the dry film resist is patterned through processes of exposure, development, and curing to form the resist 39 having the cavity 40.

Figure 7:
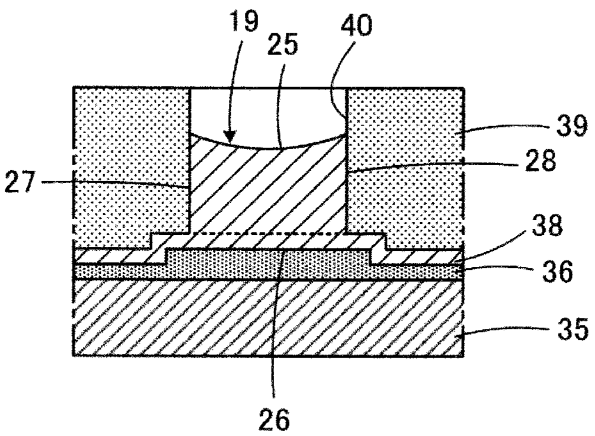
FIG. 7 is a cross-sectional view illustrating a state in which an inductor conductor is formed by electrolytic plating on the seed layer through a cavity of the resist in a step that follows the step of FIG. 6.

Next, as illustrated in FIG. 7, the inductor conductor 19 is formed, for example, of a conductive metal, such as Cu, by electrolytic plating. The conductive metal is grown to form the inductor conductor 19 by plating in the cavity 40 of the resist 39 on the seed layer 38 to which an electric charge is applied. When the seed layer 38 and the inductor conductor 19 are made of the same material, the inductor conductor 19 integrates with the seed layer 38.

In the above electrolytic plating process, the concentrations of additives used in the plating bath for the electrolytic plating are adjusted so as to obtain such a shape of the inductor conductor 19 that, with respect to the height-wise dimension of the inductor conductor 19 between the top surface 25 and the bottom surface 26, the height-wise dimension of the central portion of the top surface 25 is made smaller than the height-wise dimensions of both edge portions of the top surface 25. More specifically, for this purpose, the concentration of a "leveler" additive is increased, while the concentration of a "brightener" additive is decreased.

Figure 8:
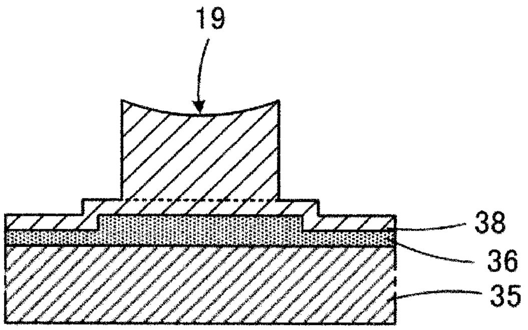
FIG. 8 is a cross-sectional view illustrating a state in which the resist is removed in a step that follows the step of FIG. 7.

Next, as illustrated in FIG. 8, the resist 39 is peeled off and removed.

Figure 9:
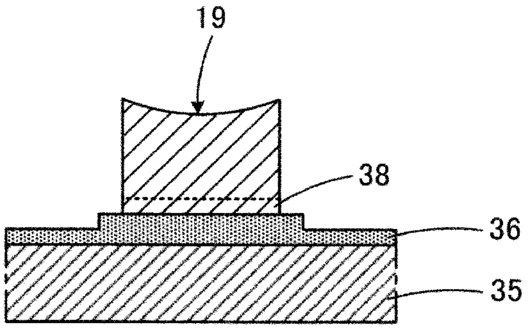
FIG. 9 is a cross-sectional view illustrating a state in which an unnecessary part is removed from the seed layer in a step that follows the step of FIG. 8.

Next, a wet etching process is carried out in the state illustrated in FIG. 8 to remove an unnecessary portion of the seed layer 38, in other words, to remove a portion of the seed layer 38 exposed from the inductor conductor 19, which results in the state illustrated in FIG. 9.

Figure 10:
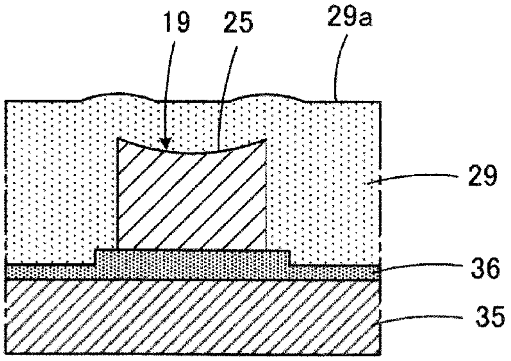
FIG. 10 is a cross-sectional view illustrating a state in which an insulating resin layer is formed so as to embed the inductor conductor therein in a step that follows the step of FIG. 9.

Next, as illustrated in FIG. 10, the insulating resin layer 29 is formed on the base layer 36 so as to embed the inductor conductor 19 therein. The insulating resin layer 29 will become part of the main body 12. The insulating resin layer 29 may be formed, for example, by applying a resin paste using spin-coating. Here, vacuum drawing may be performed if necessary to fill narrow spaces with the resin paste smoothly while suppressing bubble generation (bubble incorporation).

As illustrated in FIG. 10, the insulating resin layer 29, which is formed so as to cover the inductor conductor 19, behaves such that a portion of the resin over the width-wise center of the top surface 25 of the inductor conductor 19 tends to sink. As a result, the sinking behavior of the insulating resin layer 29 offsets the height of convex portions that would be otherwise generated on the surface 29*a* if the insulating resin layer 29 simply covered an inductor conductor that does not have the concave top surface.

Here, the insulating resin layer 29 may be patterned if necessary (illustration is omitted). For example, in the case where insulating resin layers are formed respectively for multiple inductor conductors or for multiple turns of an inductor conductor, the insulating resin layer is first formed so as to cover the entire base layer uniformly and is subsequently patterned. In this case, if a photosensitive resin is used as the material of the insulating resin layer 29, the insulating resin layer 29 can be patterned using photolithography to leave the resin at necessary positions. In the case of a non-photosensitive resin being used, unnecessary portions can be removed by using UV laser beams or drilling if the patterning is required.

The insulating resin layer 29 is preferably made of a resin that can be adhered strongly to the resin of the base layer 36. This can reduce the risk of the insulating resin layer 29 being peeled off from the base layer 36.

Figure 11:
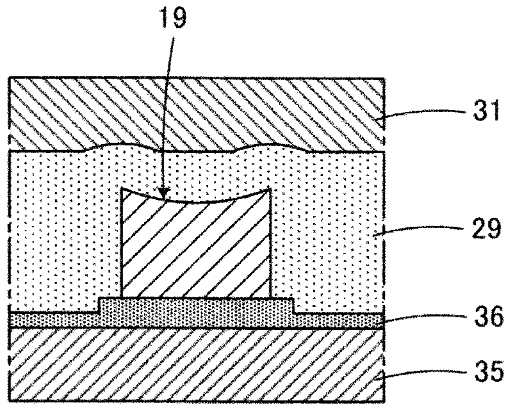
FIG. 11 is a cross-sectional view illustrating a state in which a first magnetic resin layer is formed so as to cover the insulating resin layer in a step that follows the step of FIG. 10.

Next, as illustrated in FIG. 11, the first magnetic resin layer 31, which is made of the organic material containing the metal-based magnetic powder, is formed so as to cover the insulating resin layer 29. For example, the first magnetic resin layer 31 may be formed by pressing a sheet of the organic material containing the metal-based magnetic powder onto the workpiece to obtain a state illustrated in FIG. 11. The workpiece is cured in this state.

Figure 12:
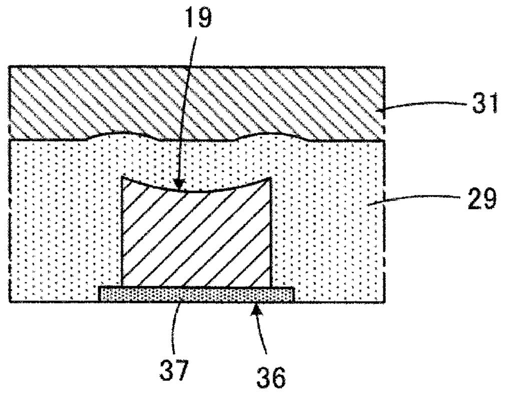
FIG. 12 is a cross-sectional view illustrating a state in which the support substrate and part of the base layer are removed in a step that follows the step of FIG. 11.

Next, as illustrated in FIG. 12, the support substrate 35 and part of the base layer 36 are removed. In FIG. 12, the projection 37 of the base layer 36 is left. The base layer 36 need not be removed and may be left intact. Leaving the base layer 36 intact does not create any specific problem. Moreover, this can reduce the risk of the inductor conductor 19 being partially removed, which may occur when the base layer 36 is removed completely.

Figure 13:
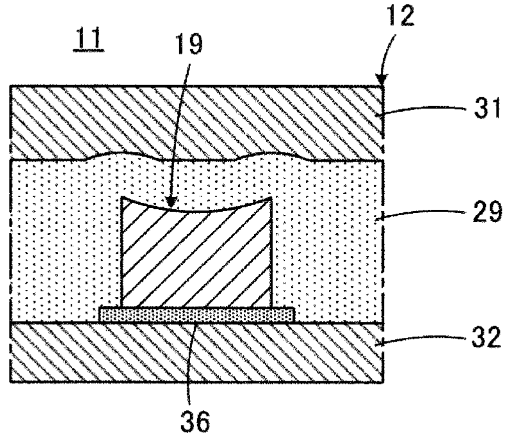
FIG. 13 is a cross-sectional view illustrating a state in which the coil component is completed after a second magnetic resin layer is formed so as to be in contact with part of the insulating resin layer and part of the base layer in a step that follows the step of FIG. 12.

Next, as illustrated in FIG. 13, the second magnetic resin layer 32, which is made of the organic material containing the metal-based magnetic powder, is formed so as to be in contact with the insulating resin layer 29 and part of the base layer 36. For example, the second magnetic resin layer 32 may be formed by pressing a sheet of the organic material containing the metal-based magnetic powder onto the workpiece to obtain a state illustrated in FIG. 13. The workpiece is cured in this state. Thus, the main body 12 is formed so as to include the second magnetic resin layer 32 and the above-described insulating resin layer 29 and first magnetic resin layer 31.

The state illustrated in FIG. 13 corresponds to the state illustrated in FIG. 2.

Meanwhile, a step of forming the lead-out conductors 23 and 24 and a step of forming the external terminal electrodes 21 and 22 are carried out in addition to the above steps. Thus, the coil component 11 is completed.

The coil component 11 is manufactured in the above-described manner. In the case where multiple coil components 11 are simultaneously made from a mother sheet, an additional step is carried out to cut the mother sheet into individual coil components 11, for example, using a dicing machine.

Second Embodiment

FIGS. 14 to 24 are cross-sectional views for explaining a method of manufacturing a coil component 11*a* according to a second embodiment of the present disclosure. In FIGS. 14 to 24, elements that correspond to the elements illustrated in FIGS. 1 to 13 will be denoted by the same reference signs, and duplicated descriptions will be omitted.

Figure 24:
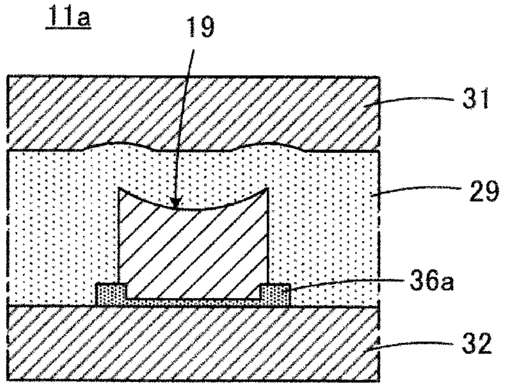
FIG. 24 is a cross-sectional view illustrating a state in which the coil component is completed after the second magnetic resin layer is formed so as to be in contact with part of the insulating resin layer and part of the base layer in a step that follows the step of FIG. 23.

Note that the structure of a completed coil component 11*a* according to the second embodiment is illustrated in FIG. 24. A preferred method of manufacturing the coil component 11*a* will be described as below.

Figure 14:
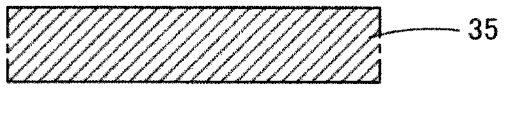
FIG. 14 is a cross-sectional view for explanation of a method of manufacturing a coil component, illustrating part of the support substrate to be prepared.

As illustrated in FIG. 14, the support substrate 35 is prepared first as is the case for the first embodiment.

Figure 15:
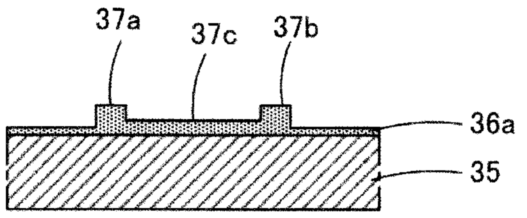
FIG. 15 is a cross-sectional view illustrating a state in which a base layer is formed on the support substrate in a step that follows the step of FIG. 14.

Next, as illustrated in FIG. 15, a base layer 36*a* is formed on the support substrate 35. The base layer 36*a* has two projections 37*a* and 37*b* and a groove 37*c* therebetween, which are formed, for example, by applying a photosensitive resin and using photolithography.

The projections 37*a* and 37*b* and the groove 37*c* may be formed directly on the support substrate 35 without disposing the base layer 36*a*. In this case, the projections 37*a* and 37*b* and the groove 37*c* can be formed by machining, such as dicing, or by using a dry process, such as sand blasting, or by using a wet process with a solvent that can dissolve part of the support substrate 35.

Figure 16:
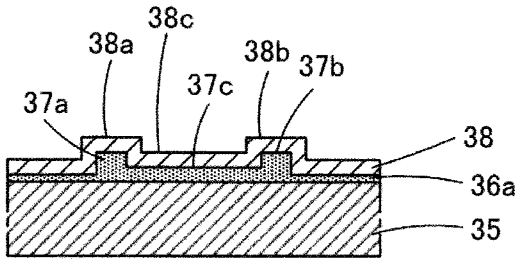
FIG. 16 is a cross-sectional view illustrating a state in which the seed layer is formed on the base layer in a step that follows the step of FIG. 15.

Next, as illustrated in FIG. 16, the electrically conductive seed layer 38 is formed on the base layer 36*a*. The seed layer 38 is formed so as to follow the upper surface of the base layer 36*a*. The seed layer 38 has projections 38*a* and 38*b* and a groove 38*c* that are formed so as to follow the projections 37*a* and 37*b* and the groove 37*c* of the base layer 36*a*.

Figure 17:
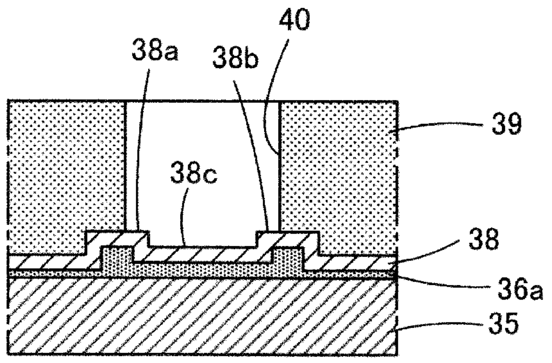
FIG. 17 is a cross-sectional view illustrating a state in which the resist is formed on the seed layer in a step that follows the step of FIG. 16.

Next, as illustrated in FIG. 17, the resist 39 is formed on the seed layer 38. The resist 39 has a cavity 40 that is patterned so as to correspond to the pattern of the inductor conductor 19. The projections 38*a* and 38*b* of the seed layer 38 are positioned at width-wise edges of the cavity 40.

Figure 18:
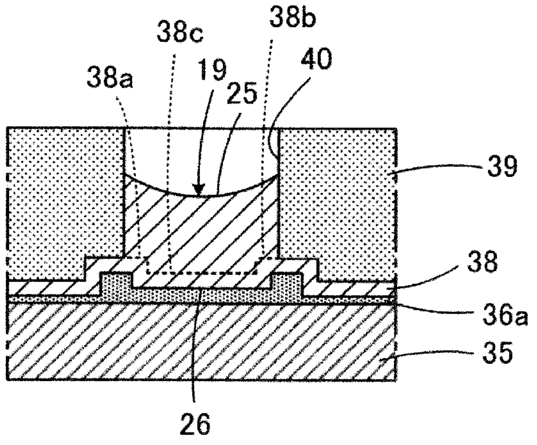
FIG. 18 is a cross-sectional view illustrating a state in which the inductor conductor is formed by electrolytic plating on the seed layer through the cavity of the resist in a step that follows the step of FIG. 17.

Next, as illustrated in FIG. 18, the inductor conductor 19 is formed, for example, of a conductive metal, such as Cu, by electrolytic plating. The conductive metal is grown by electrolytic plating to form the inductor conductor 19 in each cavity 40 of the resist 39 on the seed layer 38 to which an electric charge is applied. The inductor conductor 19 integrates with the seed layer 38.

In the above step of electrolytic plating, the inductor conductor 19 grows on the seed layer 38. Here, the projections 38*a* and 38*b* are positioned higher than the groove 38*c* on the seed layer 38. In other words, the portions of the seed layer 38 that correspond to both edge portions of the top surface 25 of the inductor conductor 19 bulge out relative to the portion of the seed layer 38 that corresponds to the central portion of the top surface 25. The inductor conductor 19 is thereby formed to have such a shape that with respect to the height-wise dimension of the inductor conductor 19 between the top surface 25 and the bottom surface 26, the height-wise dimension of the central portion of the top surface 25 is made smaller than the height-wise dimensions of both edge portions of the top surface 25.

Figure 19:
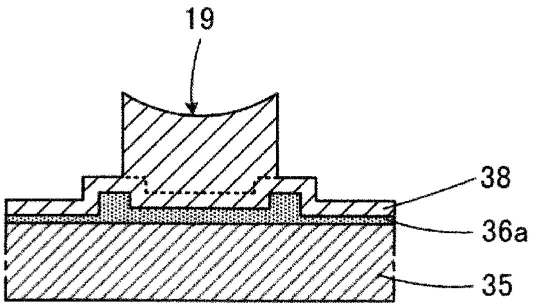
FIG. 19 is a cross-sectional view illustrating a state in which the resist is removed in a step that follows the step of FIG. 18.

Next, as illustrated in FIG. 19, the resist 39 is peeled off and removed.

Figure 20:
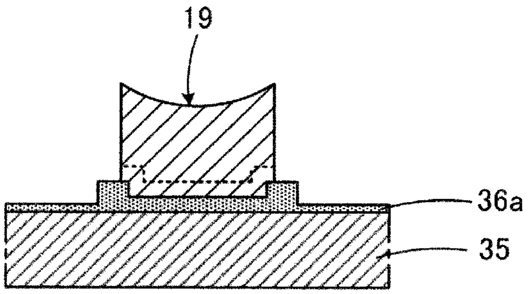
FIG. 20 is a cross-sectional view illustrating a state in which an unnecessary part is removed from the seed layer in a step that follows the step of FIG. 19.

Next, a wet etching process is carried out in the state illustrated in FIG. 19 to remove an unnecessary portion of the seed layer 38, in other words, to remove a portion of the seed layer 38 exposed from the inductor conductor 19, which results in the state illustrated in FIG. 20.

Figure 21:
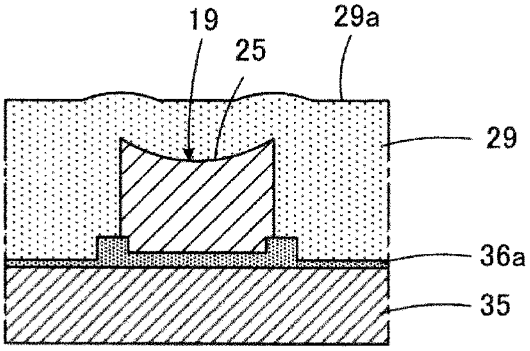
FIG. 21 is a cross-sectional view illustrating a state in which the insulating resin layer is formed so as to embed the inductor conductor therein in a step that follows the step of FIG. 20.

Next, as illustrated in FIG. 21, the insulating resin layer 29 is formed on the base layer 36*a* so as to embed the inductor conductor 19 therein. The insulating resin layer 29 will become part of the main body 12. The insulating resin layer 29, which is formed so as to cover the inductor conductor 19, behaves such that a portion of the resin over the width-wise center of the top surface 25 of the inductor conductor 19 tends to sink. As a result, the sinking behavior of the insulating resin layer 29 offsets the height of a convex portion that would be otherwise generated on the surface 29*a* if the insulating resin layer 29 simply covered the inductor conductor 19.

Here, the insulating resin layer 29 may be patterned if necessary (illustration is omitted).

Figure 22:
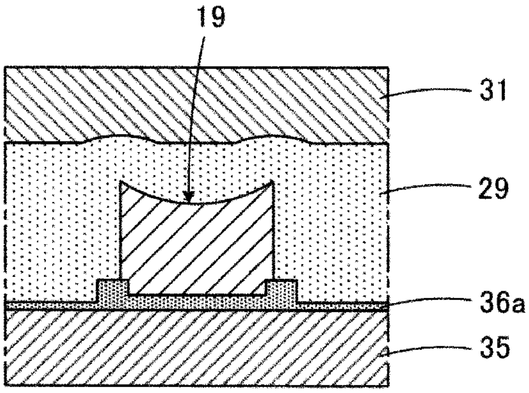
FIG. 22 is a cross-sectional view illustrating a state in which the first magnetic resin layer is formed so as to cover the insulating resin layer in a step that follows the step of FIG. 21.

Next, as illustrated in FIG. 22, the first magnetic resin layer 31 is formed so as to cover the insulating resin layer 29.

Figure 23:
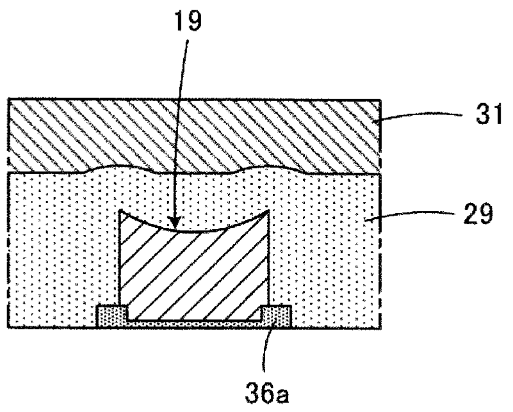
FIG. 23 is a cross-sectional view illustrating a state in which the support substrate and part of the base layer are removed in a step that follows the step of FIG. 22.

Next, as illustrated in FIG. 23, the support substrate 35 and part of the base layer 36*a* are removed. The base layer 36*a* need not be removed and may be left intact. Leaving the base layer 36*a* intact does not create any specific problem. Moreover, this can reduce the risk of the inductor conductor 19 being partially removed, which may occur when the base layer 36*a* is removed completely.

Next, as illustrated in FIG. 24, the second magnetic resin layer 32, which is made of the organic material containing the metal-based magnetic powder, is formed so as to be in contact with the insulating resin layer 29 and part of the base layer 36*a*. Thus, the main body 12 is formed so as to include the second magnetic resin layer 32 and the above-described insulating resin layer 29 and first magnetic resin layer 31.

FIG. 24 illustrates the coil component 11*a* as a completed product. Compared with the coil component 11 described above, the coil component 11*a* increases the contact area between the inductor conductor 19 and the base layer 36*a*, which improves the adhesion between the inductor conductor 19 and the base layer 36*a* and thereby increases the durability, for example, against thermal stress.

Third Embodiment

Figure 25:
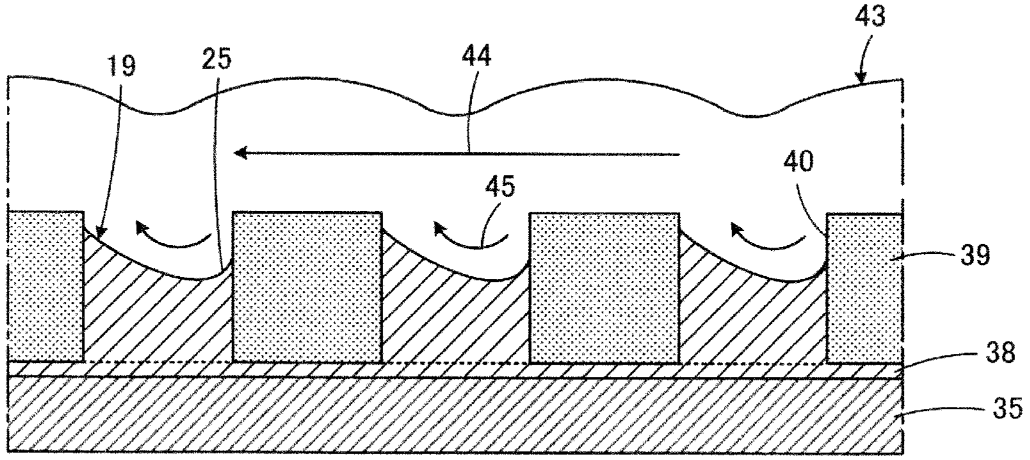
FIG. 25 is a cross-sectional view for a step that corresponds to the step of FIG. 7 in the method of manufacturing the coil component, illustrating a state in which the inductor conductor is formed by electrolytic plating on the seed layer through the cavity of the resist.

FIG. 25 is a cross-sectional view illustrating a step that corresponds to the step described in relation to FIG. 7 in a preferred method of manufacturing a coil component according to a third embodiment of the present disclosure. The elements of FIG. 25 that correspond to the elements illustrated in FIG. 7 will be denoted by the same reference signs, and duplicated descriptions will be omitted.

FIG. 25 illustrates a state in which the inductor conductor 19 is formed by electrolytic plating on the seed layer 38 through the cavity 40 of the resist 39. In the step of electrolytic plating, a plating solution in a plating bath 43 for electrolytic plating is caused to flow in a direction 44 that is parallel to the principal surfaces of the support substrate 35 and orthogonal to the extending direction of the inductor conductor 19 to be formed. The flow of the plating solution in the plating bath 43 can be generated, for example, using a spouted plating equipment.

The flow of the solution in the arrow direction 44 creates curved flows indicated by arrows 45 in the cavity 40 of the resist 39. This causes preferential deposition to occur at both edge portions of the top surface 25 of the inductor conductor 19 to be formed, which results in the inductor conductor 19 of which the height-wise dimension of the central portion of the top surface 25 is smaller than the height-wise dimensions of both edge portions of the top surface 25.

Fourth Embodiment

Figure 26:
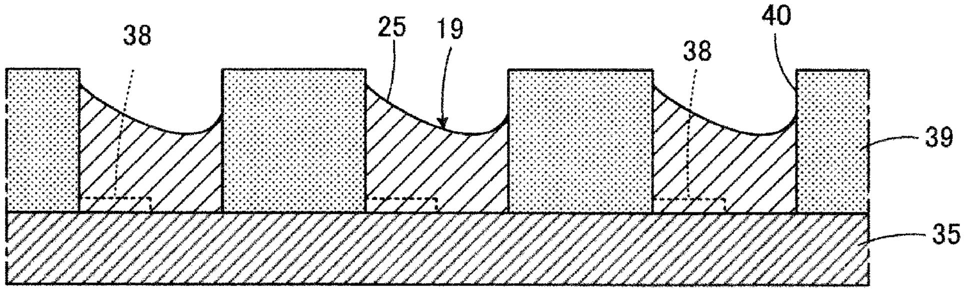
FIG. 26 is a cross-sectional view for a step that corresponds to the step of FIG. 7 in the method of manufacturing the coil component, illustrating a state in which the inductor conductor is formed by electrolytic plating on the seed layer through the cavity of the resist.
Figure 27:
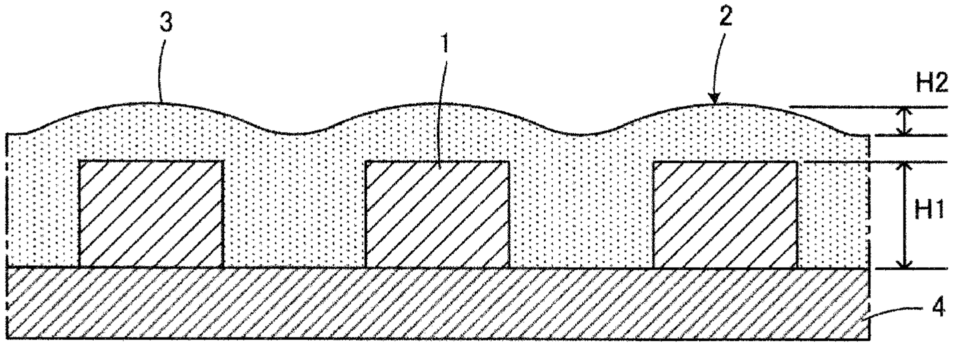
FIG. 27 is a cross-sectional view illustrating a state in which a convex surface is formed on the outer surface of the insulating resin layer that covers the inductor conductor.

FIG. 26 is a cross-sectional view illustrating a step that corresponds to the step described in relation to FIG. 7 in a preferred method of manufacturing a coil component according to a fourth embodiment of the present disclosure. The elements of FIG. 26 that correspond to the elements illustrated in FIG. 7 will be denoted by the same reference signs, and duplicated descriptions will be omitted.

FIG. 26 illustrates a state in which the inductor conductor 19 is formed by electrolytic plating on the seed layer 38 through the cavity 40 of the resist 39. The seed layer 38 in this step of electrolytic plating is such that the seed layer 38 having a width narrower than the width of the cavity 40 of the resist 39 is formed at a position closer to one of the width-wise edges of the cavity 40. This causes preferential deposition to occur at an edge portion of the top surface 25 of the inductor conductor 19 to be formed, which results in the inductor conductor 19 of which the height-wise dimension of the central portion of the top surface 25 is smaller than the height-wise dimensions of both edge portions of the top surface 25. In this case, the seed layer 38 can be formed using a subtractive method (in which a seed layer is first formed on the entire surface and subsequently the seed layer is patterned using a photoresist before electrolytic plating).

Note that in the third and fourth embodiments, the top surface 25 of the inductor conductor 19 is laterally asymmetrical. Accordingly, the lowest portion of the top surface 25 is not positioned at the width-wise center thereof, and one and the other width-wise edges of the top surface 25 have different heights. The central portion of the top surface 25, however, is lower than both edge portions of the top surface 25. Accordingly, the inductor conductor 19 satisfies the condition that with respect to the height-wise dimension of the inductor conductor 19 between the top surface 25 and the bottom surface 26, the height-wise dimension of the central portion of the top surface 25 is smaller than the height-wise dimensions of both edge portions of the top surface 25.

Embodiments of the present disclosure has been described with reference to the drawings. Various other modifications can be made within the scope of the present disclosure.

For example, the extension state of the inductor conductor, the number of inductor conductors, or the like in the coil component may be changed arbitrarily depending on design requirements. The inductor conductor may be configured to extend straight or meanderingly.

In the present disclosure, the method of forming the inductor conductor is not specifically limited here. The inductor conductor may be formed not only by the electrolytic plating described above but also, for example, by non-electrolytic plating, spattering, vapor deposition, or printing.

The inductor conductor may be formed first and then processed by machining or the like to obtain the inductor conductor in which with respect to the height-wise dimension of the inductor conductor between the top surface and the bottom surface, the height-wise dimension of the central portion of the top surface is smaller than the height-wise dimensions of both edge portions of the top surface.

The embodiments described in this specification should be construed as examples, and configurations described in different embodiments can be partially replaced with or combined with one another.

What is claimed is:

1. A coil component comprising:

at least one inductor conductor having a top surface and a bottom surface that are positioned opposite to each other and a first side surface and a second side surface that are positioned opposite to each other and connect the top surface and the bottom surface; and a resin-containing layer that at least covers the top surface, the first side surface, and the second side surface of the inductor conductor, wherein with respect to a height-wise dimension of the inductor conductor between the top surface and the bottom surface, the height-wise dimension of a central portion of the top surface is smaller than the height-wise dimension of an edge portion of the top surface at a cross section of the inductor conductor taken in a direction orthogonal to an extending direction of the inductor conductor, and in the height-wise dimension of the inductor conductor, a difference between a maximum dimension and a minimum dimension is 20% or less of the maximum dimension at a cross section of the inductor conductor taken in a direction orthogonal to the extending direction of the inductor conductor.

2. The coil component according to claim 1, wherein the resin-containing layer includes an insulating resin layer that is an electrical insulator and a non-magnetic body.

3. The coil component according to claim 2, wherein the coil component includes a plurality of the inductor conductors, and the plurality of the inductor conductors is configured such that with respect to the height-wise dimension of each conductor inductor, the height-wise dimension of the central portion of the top surface is smaller than the height-wise dimensions of both edge portions of the top surface at a cross section of each of the inductor conductors taken in a direction orthogonal to an extending direction of the each of the inductor conductors.

4. The coil component according to claim 2, wherein, the resin-containing layer integrally configures a portion covering the top surface and portions covering the first side surface and the second side surface.

5. The coil component according to claim 1, wherein the resin-containing layer includes a magnetic resin layer made of an organic material containing a metal-based magnetic powder.

6. The coil component according to claim 5, wherein the coil component includes a plurality of the inductor conductors, and the plurality of the inductor conductors is configured such that with respect to the height-wise dimension of each conductor inductor, the height-wise dimension of the central portion of the top surface is smaller than the height-wise dimensions of both edge portions of the top surface at a cross section of each of the inductor conductors taken in a direction orthogonal to an extending direction of the each of the inductor conductors.

7. The coil component according to claim 5, wherein, the resin-containing layer integrally configures a portion covering the top surface and portions covering the first side surface and the second side surface.

8. The coil component according to claim 1, wherein the resin-containing layer includes
an insulating resin layer that is an electrical insulator and a non-magnetic body and is in contact with the inductor conductor, and
a magnetic resin layer that is made of an organic material containing a metal-based magnetic powder and that covers the insulating resin layer.

9. The coil component according to claim 1, wherein the coil component includes a plurality of the inductor conductors, and the plurality of the inductor conductors is configured such that with respect to the height-wise dimension of each conductor inductor, the height-wise dimension of the central portion of the top surface is smaller than the height-wise dimensions of both edge portions of the top surface at a cross section of each of the inductor conductors taken in a direction orthogonal to an extending direction of the each of the inductor conductors.

10. The coil component according to claim 1, wherein, the resin-containing layer integrally configures a portion covering the top surface and portions covering the first side surface and the second side surface.

11. A method of manufacturing a coil component, the method comprising:
preparing a support substrate;
forming an inductor conductor when supported by the support substrate, the inductor conductor has
a top surface and a bottom surface that are positioned opposite to each other and
a first side surface and a second side surface that are positioned opposite to each other and connect the top surface and the bottom surface;
forming a resin-containing layer that at least covers the top surface, the first side surface, and the second side surface of the inductor conductor; and
removing the support substrate, wherein
in the forming of the inductor conductor, with respect to a height-wise dimension of the inductor conductor between the top surface and the bottom surface, the height-wise dimension of a central portion of the top surface is made smaller than the height-wise dimension of an edge portion of the top surface at a cross section of the inductor conductor taken in a direction orthogonal to an extending direction of the inductor conductor, and
in the height-wise dimension of the inductor conductor, a difference between a maximum dimension and a minimum dimension is 20% or less of the maximum dimension at a cross section of the inductor conductor taken in a direction orthogonal to the extending direction of the inductor conductor.

12. The method of manufacturing the coil component according to claim 11, the method further comprising:
forming a conductive seed layer on the support substrate; and
forming a resist on the seed layer, the resist having a cavity that is patterned so as to correspond to a pattern of the inductor conductor to be formed, wherein
the forming the inductor conductor includes forming the inductor conductor by electrolytic plating on the seed layer through the cavity of the resist, and
the method further comprises removing the resist.

13. The method of manufacturing the coil component according to claim 12, wherein
the forming the inductor conductor by electrolytic plating includes adjusting additive concentration in a plating bath used for electrolytic plating.

14. The method of manufacturing the coil component according to claim 13, wherein
the adjusting additive concentration includes increasing a concentration of a leveler additive and of decreasing a concentration of a brightener additive.

15. The method of manufacturing the coil component according to claim 12, wherein
in the forming of the inductor conductor by electrolytic plating, the seed layer is a seed layer of which a portion corresponding to an edge portion of the top surface of the inductor conductor bulge out relative to a portion corresponding to a central portion of the top surface.

16. The method of manufacturing the coil component according to claim 12, wherein
the forming the inductor conductor by electrolytic plating includes creating a flow of a plating solution in a plating bath used for electrolytic plating in a direction orthogonal to an extending direction of the inductor conductor to be formed.

17. The method of manufacturing the coil component according to claim 12,
in the forming of the inductor conductor by electrolytic plating, the seed layer is made narrower than a width of the cavity of the resist and is formed at a position closer to one of width-wise edges of the cavity.

* * * * *